(12) United States Patent
Carroll

(10) Patent No.: US 7,274,978 B1
(45) Date of Patent: *Sep. 25, 2007

(54) ELECTRICAL POWER SUPPLY SYSTEM FOR UNMANNED AIRCRAFT

(76) Inventor: Ernest A. Carroll, 12913 Alton Sq., No. 114, Hernson, VA (US) 20170

( * ) Notice: Subject to any disclaimer, the term of this patent is extended or adjusted under 35 U.S.C. 154(b) by 675 days.

This patent is subject to a terminal disclaimer.

(21) Appl. No.: 10/782,805

(22) Filed: Feb. 23, 2004

(51) Int. Cl.
*B64D 41/00* (2006.01)
(52) U.S. Cl. .......................................... 701/4; 244/190
(58) Field of Classification Search ................ 701/2–4, 701/23, 28; 472/7, 9, 10; 446/31, 33, 57, 446/60; 244/3.11, 3.15–3.16, 3.19, 3.21, 244/189, 190
See application file for complete search history.

(56) References Cited

U.S. PATENT DOCUMENTS

| 5,503,350 | A  | * | 4/1996  | Foote ........................ 244/1 R |
| 5,537,909 | A  |   | 7/1996  | Schneider et al. |
| 6,062,176 | A  |   | 5/2000  | Berger |
| 6,615,165 | B2 | * | 9/2003  | Carroll ........................... 703/3 |
| 6,634,593 | B2 | * | 10/2003 | Lepretre et al. ............ 244/7 B |
| 6,685,140 | B2 | * | 2/2004  | Carroll ........................ 244/139 |
| 6,721,646 | B2 | * | 4/2004  | Carroll ........................ 701/103 |
| 6,840,480 | B2 | * | 1/2005  | Carroll ........................ 244/120 |
| 6,847,865 | B2 | * | 1/2005  | Carroll ........................... 701/3 |
| 7,014,141 | B2 | * | 3/2006  | Cox et al. .................. 244/3.11 |
| 2003/0130767 | A1 | * | 7/2003 | Carroll ........................... 701/3 |
| 2003/0136876 | A1 | * | 7/2003 | Carroll ........................ 244/58 |
| 2006/0144994 | A1 | * | 7/2006 | Spirov et al. ................. 244/62 |

* cited by examiner

*Primary Examiner*—Gary Chin
(74) *Attorney, Agent, or Firm*—Maxine Barasch & Assoc. PLLC; David L. Banner

(57) ABSTRACT

A miniature, unmanned aircraft for acquiring digitized data, transmitting digitized data, or both, having an electrical supply system capable of sustained operation. The aircraft has a fuselage, a wing, a reciprocating piston internal combustion engine, a propeller, control surfaces for controlling flight, each operated by a respective servomechanism, a microprocessor for managing flight control, a GPS receiver, a communications radio frequency transceiver, and data handling apparatus. The data handling apparatus is any one of a data acquisition device for gathering environmental data, a data acquisition device for sensing aircraft altitude or attitude or both, a data relay station, or any combination of these. The data handling apparatus is preferably part of an enclosed module which is readily mounted to and detachable from the aircraft. The electrical supply system includes an engine driven generator, a battery disposed in parallel to the generator, and voltage reducing devices for operating various electrical power consuming components which operate at different voltage levels.

16 Claims, 2 Drawing Sheets

ELECTRICAL POWER SUPPLY SYSTEM FOR UNMANNED AIRCRAFT

REFERENCE TO RELATED APPLICATION

This application is related to copending applications respectively entitled UNMANNED AIRCRAFT WITH AUTOMATIC FUEL-TO-AIR MIXTURE ADJUSTMENT, Ser. No. 10/255,184; MINIATURE, UNMANNED AIRCRAFT WITH ONBOARD STABILIZATION AND AUTOMATED GROUND CONTROL OF FLIGHT PATH, Ser. No. 10/255,183; MINIATURE, UNMANNED AIRCRAFT WITH AUTOMATICALLY DEPLOYED PARACHUTE, Ser. No. 10/255,185; MANUALLY DISASSEMBLED AND READILY SHIPPABLE MINIATURE, UNMANNED AIRCRAFT WITH DATA HANDLING CAPABILITY, Ser. No. 10/255,182; ENGINE DRIVEN SUPERCHARGER FOR AIRCRAFT, Ser. No. 10/255,189; CABLE CONNECTIONS BETWEEN AN UNMANNED AIRCRAFT AND A DETACHABLE DATA HANDLING MODULE, Ser. No. 10/255,187; and MINIATURE, UNMANNED AIRCRAFT WITH INTERCHANGEABLE DATA MODULE, Ser. No. 10/255,186, all filed Sep. 26, 2002 and which are incorporated herein by reference.

BACKGROUND OF THE INVENTION

1. Field of the Invention

The present invention relates to miniature, unmanned aircraft having data acquisition capability or data transmission capability or both. More particularly, the invention sets forth an electrical supply system for accommodating diverse electrical loads imposed by onboard electrical consuming apparatus.

2. Description of the Prior Art

Aircraft can play a role in collection and transmission of data. In transmission of data, an aircraft can serve as a relaying station for remotely originating transmissions. In collection of data, aircraft can be used to carry sensors for reconnaissance and other purposes. Uses of aerial reconnaissance for collecting data, such as multispectral imagery far example, are increasing as industries and businesses come to utilize the same to enhance productivity of their operations. An exemplary use of aerial imagery is that of precision farming, although many other uses exist. As aerial imagery and other data collection technology develops, it becomes desirable to decrease cost and increase practicality of airborne platforms used to acquire aerial imagery and other data.

Aerial imagery has traditionally been acquired through manned conventional aircraft and by satellite. Although both types of platforms are effective, both are quite expensive and limited in their abilities. Miniature, unmanned aircraft would be vastly more practical and lower in cost for most civilian applications.

The type of aircraft and mission performed thereby contemplate the use of, illustratively, image gathering sensors such as color and black and white video cameras, multispectral instruments, and many other sensors, radio frequency transceivers, and electrical or electronic flight controls managed by an onboard microprocessor.

A number of these devices are electronic, and must undergo a start up procedure prior to take off. This requires a source of electrical power which may be connected to these devices for up to several minutes. An external battery pack could be employed, but would require an electrical connection terminal to the aircraft, and provides still one more item which must be transported to a take off site and otherwise handled.

Contemporary data handling missions must be capable of prolonged operation, on the order of several hours. Illustratively, in the field of precision farming, the aircraft must be able to overfly a field or farm potentially covering thousands of acres, obtain digital images of each acre, and load the data into memory or alternatively transmit the data back to ground. Operating the data gathering equipment and operating the many electrical controls of the aircraft will absorb more power than can feasibly be stored in a battery pack. Although a battery pack can be used, the penalty in additional weight is onerous, and a better solution is demanded.

Model aircraft remotely controlled by radio frequency signals have long been utilized by hobbyists among others. This has led to remotely controlled model aircraft being suggested for use in aerial data collection. U.S. Pat. No. 6,062,176, issued to Lee Berger on May 15, 2000, and U.S. Pat. No. 5,537,909, issued to Arthur J. Schneider et al., both describe use of model or miniaturized aircraft in data imagery acquisition. Berger's invention is an engine suitable for small aircraft which could be utilized for photoreconnaissance. Schneider et al., utilize a miniature reconnaissance aircraft which is carried to the subject area of interest on another aircraft. Neither of these patents sets forth an electrical supply system suitable for powering the many sensors, radio transmitter and receivers, controls, and microprocessor which are used in miniature, unmanned aircraft as contemplated by the present invention.

Neither of the above inventions and patents, taken either singly or in combination, is seen to describe the instant invention as claimed.

SUMMARY OF THE INVENTION

The present invention sets forth a power supply system which is uniquely suitable far miniature, unmanned aircraft having the many sensors, radio transceiver, GPS receiver, controls, and microprocessor which are necessary in sophisticated, large scale data collection and transfer. The power supply system includes an engine driven generator, a battery pack, and voltage reducing components for serving diverse loads at different voltages.

The battery pack enables electrical devices to be operated prior to starting the engine and taking off. Use of an engine driven generator increases the total electrical energy which will be available throughout each flight. Energy density of liquid fuels, even considering inefficiencies of internal combustion engines, is much greater than that which can be stored in even the best commercially available battery packs, thereby extending flight time. Voltage reducing components enable stock commercial electronic devices to operate at their design voltages, while the generator generates electrical power at only one voltage.

Accordingly, it is one object of the invention to provide electrical power for operating onboard electrically operated devices for a prolonged period of time.

It is another object of the invention to supply electrical power to some onboard electrically operated devices prior to engine startup and take off.

It is a further object of the invention to enable the use of diverse electrical devices operating at different voltage levels, while supplying power to all devices from a generator and a battery both operating at one voltage.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

1. General Characteristics of the Aircraft

Figure 1:
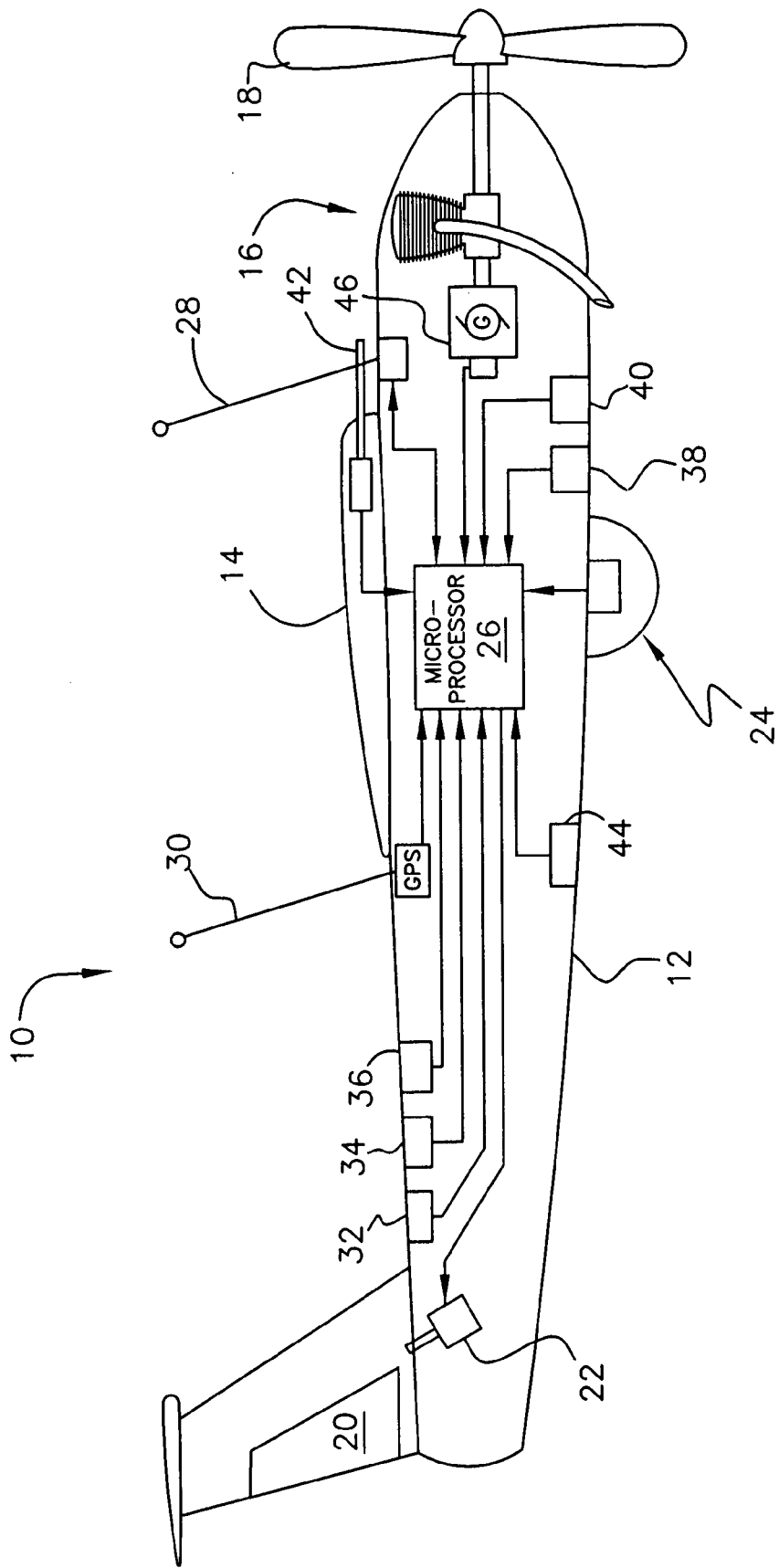
FIG. 1 is a diagrammatic aide elevational view of an exemplary aircraft which is modified according to the present invention.

FIG. 1 of the drawings shows a miniature, unmanned aircraft 10, the principal purpose of which is to acquire or transmit data or both. Acquisition of data signifies that aerial images of ground characteristics and other environmental data may be acquired by sensors such as, for example, digital cameras from the air. Aircraft 10 has an airframe including a fuselage 12, a wing 14, a reciprocating piston internal combustion engine 16 and associated fuel supply system (not separately shown) carried aboard the airframe, and a propeller 18 drivably connected to engine 16. The engine will be understood to include a fuel supply system (not separately shown) carried aboard the airframe. The airframe supports control surfaces such as elevator, rudder, flaps, and ailerons. The latter are shown representatively by rudder 20. Each control surface has a servomechanism, shown representatively as servomechanism 22.

Aircraft 10 is capable of acquiring data or transmitting data or both acquiring and transmitting data. To this end, a mission data handling apparatus 24 disposed selectively to acquire data or transmit data or to both acquire and transmit data is provided. Apparatus 24 may be, for example, a multispectral instrument, an infrared or near infrared sensor, or any other sensor which may be carried aboard miniature, remotely controlled data gathering or transmitting aircraft. Sensors and modules containing the same are more particularly set forth in the copending application entitled MINIATURE, UNMANNED AIRCRAFT WITH INTERCHANGEABLE DATA MODULE, Serial Number, to which the reader is referred.

Aircraft 10 has a remotely controlled guidance system having a microprocessor 26 disposed to manage flight, a radio frequency transceiver 28 carried aboard the aircraft and disposed to receive remotely generated flight direction commands and to communicate flight direction commands to microprocessor 26, a Global Positioning System (GPS) receiver 30, and a plurality of sensors disposed to sense and acquire data relating to stabilization (as that relates to aircraft attitude) and altitude of aircraft 10. These sensors include flight stabilization sensors including a roll sensor 32, a pitch sensor 34, and a yaw sensor 36, and redundant altitude sensors including a laser or acoustic altimeter 38 and a barometric pressure altimeter 40. A pitot tube 42 serves as a velocity sensor. A flux gate compass 44 determines direction of aircraft 10. The functions of pitot tube 42 and flux gate compass 44 may be redundantly supplemented by calculations using GPS signals considered with respect to time.

Microprocessor 26 will be understood to be a complete system including all necessary programming and memory devices (neither separately shown). Microprocessor 26 is communicably connected to all sensors, radio frequency devices, and instruments described above, so that inputs therefrom may be utilized to generate flight control commands, to transmit back to ground, or both.

In operation, aircraft 10 is controlled from a suitable ground station (not shown) or other source of radio frequency command signals. These signals include directional commands, which constitute the only source of directional instruction. No programming contained within microprocessor 26 includes predetermined directional instruction. However, programming provided within microprocessor is capable of processing inputs from the attitude and altitude sensors, and of generating command signals which are then transmitted to servomechanisms represented by servomechanism 22. In the preferred embodiment, microprocessor 26 can, by considering inputs from the various sensors and also GPS receiver 30, determine its location, attitude, altitude, and velocity. These characteristics, and optionally, received and sensed digitized data, may be transmitted to the ground station via transceiver 28. This Arrangement Respects Limitations Regarding internally contained guidance or directional control since although the ground station operator knows where aircraft 10 is, where aircraft 10 is headed, and its velocity, only attitude and altitude data and internally derived command signals are generated within aircraft 10.

A sensor (where only a digital camera is not sufficient) will be understood to include all necessary elements for operability. For example, thermal image acquisition apparatus will be understood to include a source of cooling, for reducing recorded background heat below the threshold necessary to record heat emissions from the subject of the survey. The source of cooling may be a supply of expansible refrigerant, such as a dewar containing a cryogenic material such as liquid nitrogen, or alternatively, as may be required for larger scale projects, an engine powered or electrically powered cooler such as a vapor compression refrigeration machine, a Peltier effect cooler, or any other suitable cooling device. A sensor may comprise additional data processing capability, provided by additional memory devices, microprocessor, or additional connections to a microprocessor and memory devices also utilized for other purposes such as flight guidance and image storage. For laser radar, apparatus will encompass a laser generator, rotatable reflector, and other components required for operability.

Particularly addressing civilian uses in the United States, it is highly desirable to have an unmanned aircraft which is light enough to avoid the fifty-five pound limit which is a threshold above which severe restrictions on use of an aircraft are imposed. Therefore, the total or gross weight of aircraft 10 is limited to fifty-five pounds. This limitation can be met with appropriate construction of the airframe and selection of components. The airframe is built from a composite structure including fiberglass, KEVLAR (RTM) fiber, and carbon, with aluminum, titanium, balsa wood and birch plywood structural subassemblies. The airframe can be built to house engine 16, propeller 18, the fuel supply system, radio frequency transceiver 28, servomechanisms (represented by servomechanism 22), and a suitable fuel tank (not separately shown), and can be limited in weight to twelve pounds.

A suitable engine 16, for example, producing six and one half horsepower at 10,000 RPM can be obtained as a commercial product on the remotely controlled aircraft market. Such an engine and its mounting (not shown) can be limited to seven and one half pounds.

Any one of the data handling modules, including a supporting electronic device limited to a single board computer based on Intel microprocessor architectures (e.g., microprocessor 26), can be limited to fifteen pounds.

The power supply system, including generator 46, voltage regulators (not shown) and rechargeable nickel metal hydride battery packs 48 (see FIG. 2), based upon 1.2 volt cells can be limited to five pounds.

A parachute subsystem (described in copending application entitled MINIATURE, UNMANNED AIRCRAFT WITH AUTOMATICALLY DEPLOYED PARACHUTE, to which the reader is referred) including a pyrotechnic deployment device similar to that utilized to deploy automotive airbags, capable of decelerating aircraft 10 to a landing speed not to exceed sixteen feet per second, can be limited to five pounds.

The above recited construction allows for seven and one half pounds of fuel, which in an airframe having a length of six to seven feet, wingspan of ten to twelve feet, and total weight under fifty-five pounds, can sustain operation at an average speed of fifty-five miles per hour for three hours. The above specifications allow a three pound margin of error to allow for variation in specific component selection and fabrication techniques.

2. Electrical Power Supply System

Figure 2:
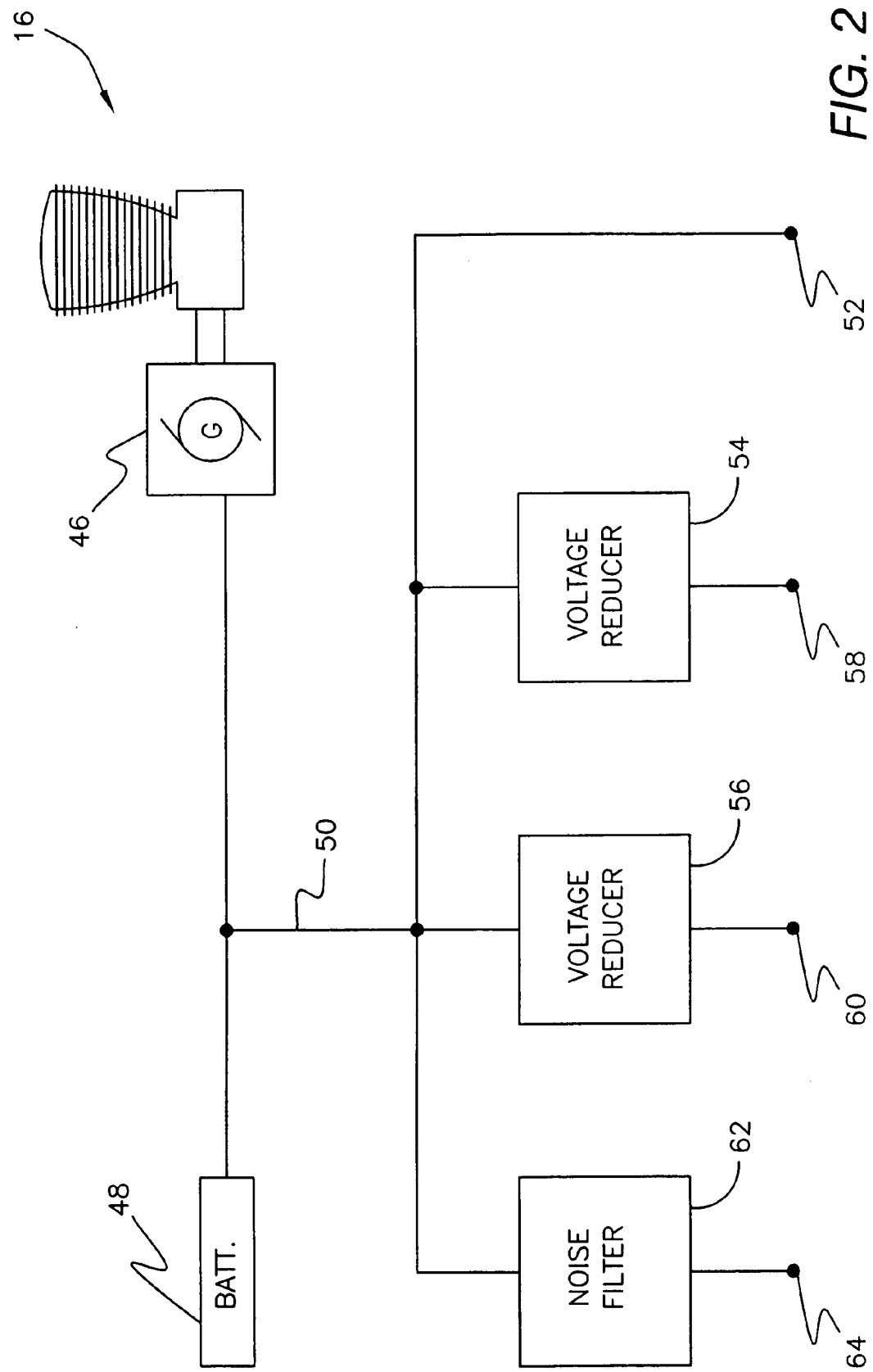
FIG. 2 is a diagrammatic view of major components of one embodiment of an electrical supply system usable with the aircraft of FIG. 1.

Turning now to FIG. 2, engine 16 is drivably connected to generator 46. Generator 46 may be, for example, a generator intended for use with motorcycles, having a nominal output on the order of 500 Watts at 12 volts. For most embodiments of aircraft 10, the maximum power usage is on the order of 175 Watts. However, radar based sensors, where utilized, may increase overall power consumption up to approximately 500 Watts. Obviously, a generator of capacity reduced from 500 Watts may be selected where the lower consumption is anticipated. This is especially advantageous where selection of other components of increased weight from those proposed above requires adjustment of gross weight to remain under fifty-five pounds.

The output of generator 46 is electrically connected to a battery pack 48. Battery pack 48 is preferably of a rechargeable nickel metal hydride type, and is based upon 1.2 volt cells (not separately shown). Of course, other types of cells, even including only one cell, could be substituted for battery pack 48 if desired. Battery pack 48 has two terminals (not separately shown) for connection, as is conventional. Conductors 50 connect the output of generator 46 to appropriate terminals of battery pack 48 and to electrical power consuming equipment, as described hereinafter. Conductors 50 will be understood to form complete circuits to power consuming equipment described herein, and include at least two conductors appropriately insulated to protect integrity of the electrical system.

Electrical power is distributed by conductors 50 to data handling apparatus 24, microprocessor 26, radio frequency transceiver 28, and to each servomechanism (representatively shown as 22) and to all other electrical power consuming devices carried aboard aircraft 10 except for the parachute subsystem. The latter has a dedicated battery (not shown herein) to promote failsafe operation in the event of failure of the general electrical power system.

Power may be utilized in any one of three modes. As represented by terminals 52, power may be directly connected from generator 46 and battery pack 48 to any power consuming device. In a second mode, power may be reduced in voltage by voltage reducing devices 54 and 56 prior to being output for direct usage at respective terminals 58 and 60. Power reducing devices may be, for example, power conversion modules such as models PM20-12503 (device 54) and PM30-12505 (device 56), as distributed by Lamda, 3055 Del Sol Boulevard, San Diego, Calif. 92154. Devices 54 and 56 accept voltage inputs varying between nine and eighteen volts, and have respective outputs of 3.3 volts and 5 volts. Power reducing devices are interposed between, on the one hand, generator 46 and battery pack 48, and on the other hand, any electrical power consuming device carried aboard aircraft 10.

In a third mode, a noise filter 62 and associated output connections 64 are interposed between power supplied by conductors 50 and an electrical power consuming device connected to output connections 64. Noise filter 62 is of any well known type for the purpose of protecting electrical power consuming devices by suppressing line noise. Noise filter 62 may be used together with a voltage reducing device 54 or 56 if desired.

It will be understood that components described as being mounted to structural part of aircraft may alternatively be mounted to another part. Illustratively, the engine and propeller may be mounted to the wing. Data handling modules may be fixed to the wing. A horizontal stabilizer may be fixed to the fuselage rather than to the vertical stabilizer as shown. Sensors for any purpose may be mounted directly on the wing or fuselage or both in the absence of readily removable, enclosed modular configuration. GPS and communications radio frequency components may be fixed to the wing or mounted on a data handling module.

Components and systems described herein will be understood to include all necessary support apparatus required for operability. For example, electrical devices which cannot be operated directly by commands from microprocessor 26 will be understood to include a power amplifier (not shown) or any other device or connection required for operability. It is to be understood that the present invention is not limited to the embodiments described above, but encompasses any and all embodiments within the scope of the following claims.

I claim:

1. A miniature, unmanned aircraft having a fuselage, a wing fixed to said fuselage, a reciprocating piston internal combustion engine supported on said aircraft, a propeller drivably connected to said engine, control surfaces operably attached to said aircraft and a servomechanism operably connected to each said control surface, a microprocessor carried aboard said aircraft, for managing flight control, a radio frequency receiver carried aboard said aircraft and connected to said microprocessor, and a data handling apparatus carried aboard said aircraft; and an electrical power supply system for supplying electrical power to said microprocessor, said radio frequency receiver, said data handling apparatus, and each said servomechanism, comprising a generator carried aboard said aircraft and driven by said engine, having an electrical output, and a battery pack having battery terminals, and electrical conductors disposed to electrically connect said microprocessor, said radio frequency receiver, said data handling apparatus, and each said servomechanism to said output of said generator and also to said battery terminals, wherein gross weight of said aircraft is limited to fifty-five pounds.

2. The miniature, unmanned aircraft according to claim 1, wherein said data handling apparatus is a data transmitter disposed to transmit digitized data.

3. The miniature, unmanned aircraft according to claim 1, wherein said data handling apparatus is a data acquisition device disposed to acquire environmental data.

4. The miniature, unmanned aircraft according to claim 1, wherein said data handling apparatus is a flight data acquisition device disposed to sense data relating to at least one of aircraft altitude and aircraft attitude.

5. The miniature, unmanned aircraft according to claim 1, further including a GPS receiver communicably connected to said microprocessor.

6. The miniature, unmanned aircraft according to claim 1, further including a radio frequency transmitter communicably connected to said microprocessor.

7. The miniature, unmanned aircraft according to claim 1, further including at least one voltage reducing device for adjusting generator output voltage to a predetermined lower voltage for operating at least one of said microprocessor, said radio frequency receiver, said data handling apparatus, and said servomechanism at a voltage lower than that output by said generator, wherein said voltage reducing device is interposed between any one component of a first group of power supplying components including said battery pack and said generator and at least one component of a second group of power consuming components including said microprocessor, said radio frequency receiver, said data handling apparatus, and said servomechanism.

8. The miniature, unmanned aircraft according to claim 1, further including at least one noise filter connected to one of said conductors in a manner protecting at least one of said microprocessor, said radio frequency receiver, said data handling apparatus, and a said servomechanism from line noise.

9. A miniature, unmanned aircraft having
a fuselage, a wing fixed to said fuselage, a reciprocating piston internal combustion engine supported on said aircraft, a propeller drivably connected to said engine, control surfaces operably attached to said aircraft and a servomechanism operably connected to each said control surface, a microprocessor carried aboard said aircraft, for managing flight control, and a radio frequency receiver carried aboard said aircraft and connected to said microprocessor;
a data handling module including a data handling apparatus disposed to receive data, a housing which is manually removably attached to said aircraft and which is disposed to substantially enclose said data handling apparatus, and manual fasteners for removably attaching said housing to one of said fuselage and said wing; and
an electrical power supply system for supplying electrical power to at least said microprocessor, said radio frequency receiver, said data handling apparatus, and each said servomechanism, comprising a generator carried aboard said aircraft and driven by said engine, having an electrical output, and a battery pack having battery terminals, and electrical conductors disposed to electrically connect said microprocessor, said radio frequency receiver, said data handling apparatus, and each said servomechanism to said output of said generator and also to said battery terminals.

10. The miniature, unmanned aircraft according to claim 9, wherein said data handling apparatus is a data transmitter disposed to transmit digitized data.

11. The miniature, unmanned aircraft according to claim 9, wherein said data handling apparatus is a data acquisition device disposed to acquire environmental data.

12. The miniature, unmanned aircraft according to claim 9, wherein said data handling apparatus is a flight data acquisition device disposed to sense data relating to at least one of aircraft altitude and aircraft attitude.

13. The miniature, unmanned aircraft according to claim 9, further including a CPS receiver communicably connected to said microprocessor.

14. The miniature, unmanned aircraft according to claim 9, further including a radio frequency transmitter communicably connected to said microprocessor.

15. The miniature, unmanned aircraft according to claim 9, further including at least one voltage reducing device for adjusting generator output voltage to a lower voltage for operating at least one of said microprocessor, said radio frequency receiver, said data handling apparatus, and said servomechanism at a voltage lower than that output by said generator, wherein said voltage reducing device is interposed between any one component of a first group of power supplying components including said battery pack and said generator and at least one component of a second group of power consuming components including said microprocessor, said radio frequency receiver, said data handling apparatus, and said servomechanism.

16. The miniature, unmanned aircraft according to claim 9, further including at least one noise filter connected to one of said conductors in a manner protecting at least one of said microprocessor, said radio frequency receiver, said data handling apparatus, and a said servomechanism from line noise.

* * * * *